March 3, 1953 H. D. EARL ET AL 2,630,560

RADIO-FREQUENCY TRANSFORMER

Filed April 5, 1949

INVENTORS.
Marion J. Pifer
BY Howard D. Earl
[signature]
Attorney

Patented Mar. 3, 1953 2,630,560

UNITED STATES PATENT OFFICE 2,630,560

RADIO-FREQUENCY TRANSFORMER

Howard D. Earl, Buffalo, and Marion J. Pifer, Williamsville, N. Y., assignors, by mesne assignments, to Sylvania Electric Products Inc., New York, N. Y., a corporation of Massachusetts Application April 5, 1949, Serial No. 85,654

11 Claims. (Cl. 336—131)

Figures 1, 2A, 2B, 2C:
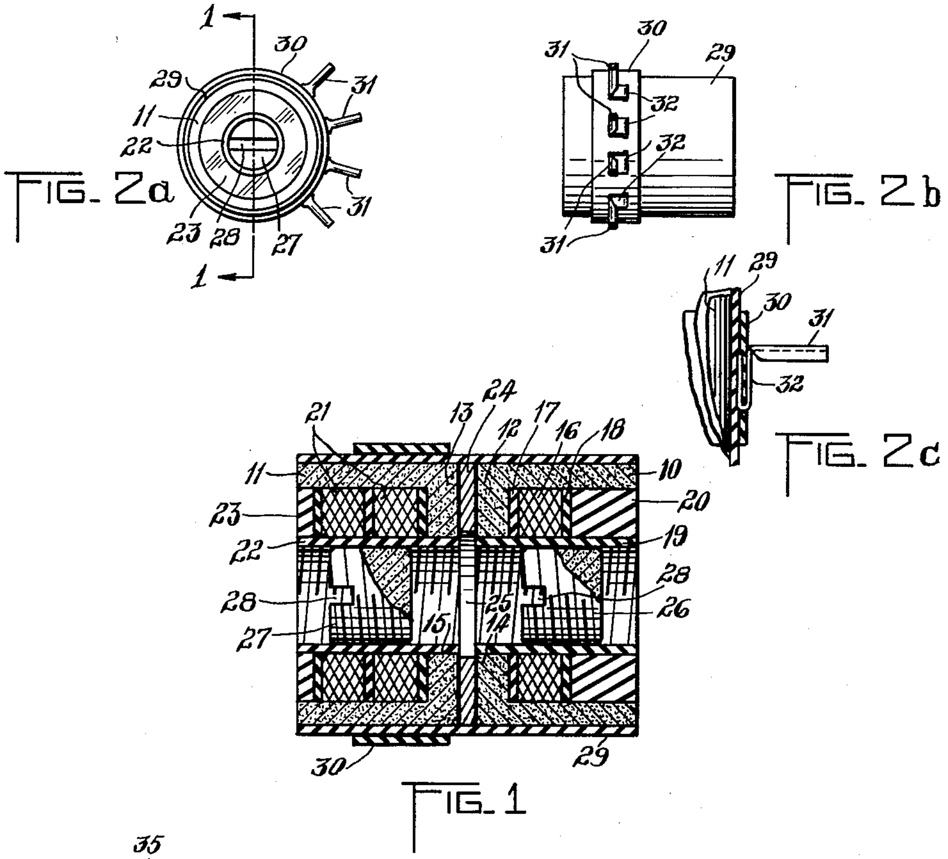

The present invention relates to radio-frequency transformers and, particularly, to such transformers of the powdered-iron-core type. While the invention is useful in a wide range of applications, it has particular utility in transformers used to couple intermediate-frequency amplifier stages of a radio receiver and will be described in that connection.

The intermediate-frequency amplifier stages of a radio receiver conventionally are coupled by transformers having primary and secondary windings tuned by individual capacitances to the intermediate frequency. The coefficient of coupling between the windings, which is determinative of the frequency pass-band characteristic of the transformer, is usually established by an initial preselected physical spacing of one winding relative to the other. Each such transformer is usually enclosed within a conductive housing to shield the transformer windings from stray electromagnetic fields. Powdered-iron cores, adjustably movable from the exterior of the shielding housing, are conventionally provided for the purpose of adjusting the individual values of inductance of the primary and secondary windings to tune the transformer to a desired intermediate frequency.

It is usually desired that the transformer windings of intermediate-frequency transformers have approximately critical coupling; namely, one in which the secondary circuit couples into the primary circuit at resonance a value of resistance equal to the primary-circuit resistance. This value of coupling is ordinarily so small as to result in substantial physical spacing of the transformer windings, thereby causing the transformer structure to have a physical size much larger than desired in many applications.

Somewhat to reduce the physical size of the transformer windings themselves, it has been proposed that the latter be surrounded with a sleeve of powdered-iron material or that the windings be enclosed within a completely closed housing itself formed of powdered-iron material. While this increases the inductance of each winding and thereby effects a decrease of their physical size, the coefficient of coupling between the windings may actually be substantially increased thus to necessitate that the windings be physically separated by a distance larger than would be the case if the sleeve or housing had not been used. The resultant structure may, however, occupy somewhat less volume than a transformer which does not use such sleeve or housing, this for the reason that the sleeve or housing may dispense with the need for the conductive shielding housing which is ordinarily required.

An additional structure heretofore proposed for effecting a reduction of the physical size of the transformer contemplates that each transformer winding shall be enclosed with a cup-shaped member of powdered-iron material with the open mouths of the members facing one another but spaced a sufficient distance apart as to provide the desired coefficient of coupling between the windings. Since with this structure the cup-shaped members do not provide total enclosure for the windings it is necessary to enclose the structure within a conductive shielding housing but the latter may now have relatively small cross-sectional dimensions without impairing the high value of Q desired of the windings. While this structure does reduce the overall physical size of the transformer, it is nevertheless not able to provide the very small physical size often desired in many applications.

It is an object of the present invention, therefore, to provide a new and improved radio frequency transformer having a physical size much smaller than has heretofore been readily attainable in practice.

It is a further object of the invention to provide a novel radio-frequency transformer of small physical size yet possessing electrical characteristics which are not impaired by the reduced size of the transformer.

It is an additional object of the invention to provide a radio-frequency transformer having a very simple and inexpensive construction yet one which enables the attainment of optimum electrical characteristics.

It is yet another object of the invention to provide a radio-frequency transformer having members of magnetic material movable to adjust the value of inductance of each of the transformer windings yet one in which such adjustments of inductance may be effected in a new and improved manner from one end only of the transformer.

In accordance with the invention, a radio-frequency transformer comprises a pair of formed cup-shaped cores of powdered ferro-magnetic material positioned with the bases of the cores in opposing realtion but separated by a conductive sheet material having a centrally positioned aperture of a size selected with relation to the desired vaule of coupling coefficient between the transformer windings. The transformer includes a pair of transformer windings positioned within individual ones of the cores with the windings coaxially related one to the other. The windings are supported on hollow winding forms, and the transformer includes a pair of externally threaded inductance adjusting cores of powdered ferro-magnetic material threaded into the winding forms for individual movement with relation to individual ones of the windings to adjust the individual values of inductance thereof.

For a better understanding of the present invention, together with other and further objects thereof, reference is had to the following description taken in connection with the accompanying drawing, and its scope will be pointed out in the appended claims.

Figure 3A:
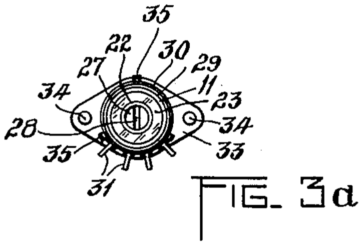
Figure 4:
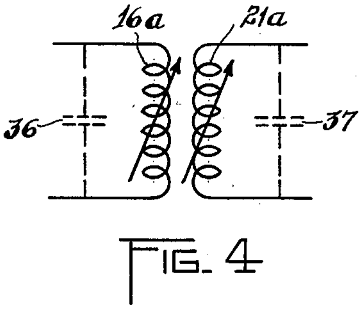
Figure 3B:
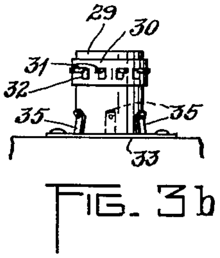
Figure 3C:
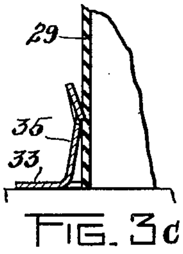

In the drawing, Figure 1 is an elevational view in cross-section illustrating the construction of a radio-frequency transformer embodying the present invention; Figures 2*a*, 2*b* and 2*c* illustrate the arrangement and construction of a terminal strip employed on the transformer; Figures 3*a*, 3*b* and 3*c* illustrate the construction of a suitable securing device by which the transformer of the invention may be mechanically secured to a radio chassis; and Figure 4 represents the equivalent circuit diagram of the Fig. 1 transformer.

Referring now more particularly to Fig. 1 of the drawing, the transformer includes a pair of formed cup-shaped cores 10, 11 of powdered ferro-magnetic material which may be finely comminuted iron particles held together and insulated from one another by a suitable dielectric binder, the material being commonly called a "powdered iron" core material having any of several compositions now well known in the art. Each of the cores 10 and 11 is of cylindrical cross section and has a planar base portion 12, 13 with a centrally positioned aperture 14, 15.

The transformer also includes a first multi-layer winding 16 wound between end discs 17, 18 of insulating material on a hollow winding form 19 also of insulating material. The winding structure 16—19 is positioned within the core 10 in coaxial relation therewith, and the space between the winding structure and the core is filled with a suitable wax 20 which maintains the winding in assembled relation within the core and also provides some moisture proofing of the winding. A two-section winding 21, wound upon a hollow winding form 22 in a manner similar to that of the winding 16, is positioned within the core 11 in coaxial relation therewith. The end space between the winding 21 and the core 11 is filled with wax 23 to maintain the winding in position and to provide some moisture proofing.

There is also included in the transformer a conductive thin sheet material, in the form of a disc or washer 24, having a centrally positioned aperture 25. The disc 24 may be stamped or otherwise formed from a sheet of conductive material or may be integrally formed with one of the cores 10 or 11 by an electroplating or the like process. Its thickness is shown somewhat exaggerated in the drawing for purposes of clarity of illustration. It is the purpose of the disc 24 to reduce the magnitude of inductive coupling between the windings 16 and 21. To this end, the parameters of the cores 10 and 11 and of the disc 24 are selected to provide a desired value of coupling coefficient between the windings. The more important parameters in this regard are the sizes of the apertures 14 and 15 of the respective cores 10 and 11, the thickness of the material of the disc 24, its resistivity, and the size of its aperture 25. In general, the coupling coefficient may conveniently be established ordinarily merely by the choice of the size of the aperture 25 of the disc 24.

The cores 10 and 11 and the disc 24 are cemented together in coaxial relation, by the use of any suitable cement, with the bases of the cores in opposing relation but separated by the disc 24 as illustrated in Figure 1.

The transformer also includes a pair of formed inductance adjusting cores 26, 27 of powdered ferro-magnetic material which may have the same composition as that of the cores 10 and 11. The cores 26 and 27 are supported for individual movement with relation to individual ones of the windings 16 and 21 to adjust the individual values of inductance thereof. To this end, and as shown in the drawing, the cores 26 and 27 are formed with external threads and are threaded into the closely fitting winding forms 19 and 22. Each of the cores 26 and 27 also is provided with a screw-driver slot 28 formed in one end thereof, and the cores may be so inserted in the transformer that the slots of both cores face one end of the transformer for a purpose to be explained hereinafter.

It is convenient to enclose the transformer in a jacket 29 of insulating material, which may comprise one or more turns of paper or cardboard wrapped around the transformer and cemented in place thereon. As shown more clearly in Figs. 2*a*, 2*b*, and 2*c*, the transformer is provided with a terminal strip 30 which may be considered as a part of the jacket 29 secured to the external surface of the cores 10 and 11. The terminal strip 30 includes a plurality of conductive terminals 31 which, as shown more clearly in Figure 2*c*, have an end portion 32 anchored to the terminal strip 30 which is of insulating material. The ends of the windings 16 and 21 extend out of the open mouths of the cores 10 and 11, through the wax 20, 23, and are electrically connected to the terminals 31 in conventional manner.

The transformer may be conveniently secured mechanically to the chassis of a radio apparatus by a form of socket structure shown more clearly in Figs. 3*a*, 3*b*, and 3*c*. This socket structure includes a base portion 33 having apertures 34, 34 to receive machine screws or rivets by which to secure the socket mechanically to the radio chassis. A plurality of resilient fingers 35, formed integrally with the base portion 33 of the socket, receive and position the transformer. As shown more clearly in Fig. 3*c*, each of the fingers 35 has an inwardly projecting pointed lug formed near the end of the finger to engage the jacket 29 of the transformer mechanically to lock the transformer in position in the socket. The socket may be formed of beryllium copper to insure adequate resiliency of the fingers 35.

Figure 4 represents the equivalent circuit diagram of the transformer, the adjustable inductor 16*a* representing the primary winding 16 and the adjustable inductor 21*a* representing the secondary winding 21 of the transformer. The inductors 16*a* and 21*a* with the respective condensers 36 and 37 are tuned to the operating frequency, the condensers 36 and 37 being shown in broken lines for the reason that they may be comprised in whole or in part of the distributed capacitances of the respective inductors 16*a* and 21*a* and the wiring of the circuits in which the inductors are included. As indicated by the structure of Fig. 1, the primary and secondary windings may be tuned to resonance by movement of the cores 26 and 27 adjusted from one end of the transformer. For this purpose, the core 27 is completely removed from the transformer and the position of the core 26 is then adjusted by an adjusting tool inserted through the winding form 22 into engagement with the slot 28 of the core 26. Removal of the core 27 from the transformer completely detunes the circuit of the secondary winding 21 so that it has no effect on the tuning of the primary circuit winding. After the primary circuit winding has thus been tuned to resonance at the operating frequency, the core 27 is reinserted in the transformer and moved, by engagement of the adjusting tool with its slot 28, until the secondary winding 21 also has its value of inductance adjusted to resonate the secondary circuit to the operating frequency.

As illustrative of a specific embodiment of the invention, the following parameters are given for an embodiment of the invention of the type shown in Figure 1:

| | |
|---|---|
| Overall length of transformer____inch__ | 0.625 |
| Diameter of transformer________do____ | 0.5 |
| Disc 24 of aluminum of thickness_do____ | 0.015 |
| Depth of large bore in cores 10 and 11 ________inch__ | 0.25 |
| Diameter of core apertures 14 and 15 ________inch__ | 0.21875 |
| Thickness of cup wall and base of cores 10 and 11, approximately_______inch__ | 0.0625 |
| Diameter of aperture 25, approximately ________inch__ | 0.25 |
| Inductance of winding 16 (1000 cycles) ________millihenries__ | 5.25 |
| Inductance of winding 21 (1000 cycles) ________millihenries__ | 12.5 |
| Impedance of winding 16: | |
| With winding 21 short circuited ohms__ | 500,000 |
| With winding 21 resonated___do____ | 225,000 |
| Impedance of winding 21: | |
| With winding 16 short circuited ohms__ | 920,000 |
| Operating frequency________kilocycles__ | 257.5 |

From the foregoing description of the invention, it will be apparent that a radio-frequency transformer embodying the invention is of very simple, compact and inexpensive construction. A transformer embodying the invention has the advantages that its winding Q's are comparable to those of much larger transformers and its cup-shaped cores provide adequate electromagnetic wave shielding of the transformer windings so that the transformer does not need to be enclosed within any shielding housing of conductive material. There is the further advantage that the transformer windings are totally enclosed within the transformer structure, and thus are protected from mechanical injury, yet at the same time are replaceable in a simple manner and are moisture proofed by their sealed enclosure within the cup-shaped cores of the transformer. A transformer embodying the invention has the additional advantage that all adjustments of the tuning cores associated with the transformer windings may be effected if desired from one end only of the transformer structure.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A radio-frequency transformer comprising, a pair of formed cup-shaped cores of powdered ferro-magnetic material, a first winding coaxially positioned within one of said cores and a second winding coaxially positioned within the other of said cores, the base of each of said cores having a centrally positioned aperture providing a value of coupling between said windings larger than desired when said cores are positioned with their bases in closely spaced opposing relation, and a conductive sheet material having a centrally positioned aperture of size selected to reduce to a desired value the coupling coefficient between said windings, said cores and said conductive sheet material being positioned with their apertures in substantial alignment and with the bases of said cores in opposing relation but separated by said conductive material.

2. A radio-frequency transformer comprising, a pair of formed cup-shaped cores of powdered ferro-magnetic material, a first winding coaxially positioned within one of said cores and a second winding coaxially positioned within the other of said cores, the base of each of said cores having a centrally positioned aperture providing a value of coupling between said windings larger than desired when said cores are positioned with their bases in closely spaced opposing relation, and a member of conductive sheet material having a centrally positioned aperture of size selected to reduce to a desired value the coupling coefficient between said windings, said cores and said member being assembled as a unitary structure with their apertures in substantial alignment and with the bases of said cores in opposing relation but separated by said conductive member.

3. A radio-frequency transformer comprising, a pair of formed cup-shaped cores of powdered ferro-magnetic material, said cores having a planar base portion, a first winding coaxially positioned within one of said cores and a second winding coaxially positioned within the other of said cores, the base of each of said cores having a centrally positioned aperture providing a value of coupling between said windings larger than desired when said cores are positioned with their bases in closely spaced opposing relation, and a member of conductive sheet material having a centrally positioned aperture of size selected to reduce to a desired value the coupling coefficient between said windings, said cores and said member being assembled as a unitary structure with their apertures in substantial alignment and with the bases of said cores cemented to opposite sides of said conductive member.

4. A radio-frequency transformer comprising, a pair of formed cylindrical cup-shaped cores of powdered ferro-magnetic material, a first winding coaxially positioned within one of said cores and a second winding coaxially positioned within the other of said cores, the base of each of said cores having a centrally positioned aperture providing a value of coupling between said windings larger than desired when said cores are positioned with their bases in closely spaced opposing relation, and a disc of conductive material having a centrally positioned aperture of size selected to reduce to a desired value the coupling coefficient between said windings, said cores and said disc being positioned in coaxial relation with their apertures in substantial alignment and with the bases of said cores in opposing relation but separated by said disc.

5. A radio-frequency transformer comprising, a pair of formed cup-shaped cores of powdered ferro-magnetic material, the base of each of said cores having a centrally positioned aperture, a first winding coaxially positioned within one of said cores and a second winding coaxially positioned within the other of said cores, the base of each of said cores having a centrally positioned aperture providing a value of coupling between said windings larger than desired when said cores are positioned with their bases in closely spaced opposing relation, and a conductive sheet material having a centrally positioned aperture, the size of said last-mentioned aperture together with that of said base apertures and the thickness of said conductive material all being selected to reduce to a desired value the coupling coefficient between said windings and said cores and said conductive material being positioned with their apertures in substantial alignment and with the bases of said cores in opposing relation but separated by said conductive material.

6. A radio-frequency transformer comprising, a pair of formed cup-shaped cores of powdered ferro-magnetic material, a first winding coaxially positioned within one of said cores and a second winding coaxially positioned within the other of said cores, the base of each of said cores having a centrally positioned aperture providing a value of coupling between said windings larger than desired when said cores are positioned with their bases in closely spaced opposing relation and a disc of thin conductive sheet material having a centrally positioned aperture, the size of said aperture and the thickness of said conductive material being selected to reduce to a desired value the coupling coefficient between said windings and said cores and said disc being positioned with their apertures in substantial alignment and with the bases of said cores in opposing relation but separated by said disc.

7. A radio-frequency transformer comprising, a pair of formed cup-shaped cores of powdered ferro-magnetic material, a first winding coaxially positioned within one of said cores and a second winding coaxially positioned within the other of said cores, the base of each of said cores having a centrally positioned aperture providing a value of coupling between said windings larger than desired when said cores are positioned with their bases in closely spaced opposing relation, a conductive sheet material having a centrally positioned aperture of size selected to reduce to a desired value the coupling coefficient between said windings, said cores and said conductive material being positioned with their apertures in substantial alignment and with the bases of said cores in opposing relation but separated by said conductive material, and a pair of formed inductance-adjusting cores of powdered ferro-magnetic material supported for individual movement with relation to individual ones of said windings to adjust the individual values of inductance thereof.

8. A radio-frequency transformer comprising, a pair of formed cup-shaped cores of powdered ferro-magnetic material, a first winding supported on a hollow winding form in coaxial position within one of said cores and a second winding supported on a hollow winding form in coaxial position within the other of said cores, the base of each of said cores having a centrally positioned aperture providing a value of coupling between said windings larger than desired when said cores are positioned with their bases in closely spaced opposing relation, a conductive sheet material having a centrally positioned aperture of size selected to reduce to a desired value the coupling coefficient between said windings, said cores and said conductive material being positioned with their apertures in substantial alignment and with the bases of said cores in opposing relation but separated by said conductive material, and a pair of externally threaded inductance-adjusting cores of powdered ferro-magnetic material threaded into said winding forms for individual movement with relation to individual ones of said windings to adjust the individual values of inductance thereof.

9. A radio-frequency transformer comprising, a pair of formed cup-shaped cores of powdered ferro-magnetic material, a first winding supported on a hollow winding form in coaxial position within one of said cores and a second winding supported on a hollow winding form in coaxial position within the other of said cores, the base of each of said cores having a centrally positioned aperture providing a value of coupling between said windings larger than desired when said cores are positioned with their bases in closely spaced opposing relation, a conductive sheet material having a centrally positioned aperture of size selected to reduce to a desired value the coupling coefficient between said windings, said cores and said conductive material being positioned with their apertures in substantial alignment and with the bases of said cores in opposing relation but separated by said conductive material, and a pair of externally treaded inductance-adjusting cores of powdered ferro-magnetic material threaded into said winding forms for individual movement with relation to individual ones of said windings to adjust the individual values of inductance thereof, said last-mentioned cores each having an adjusting-tool slot in one end thereof and being so positioned in said winding forms that the slots of both cores face one end of said transformer.

10. A radio-frequency transformer comprising, a pair of formed cup-shaped cores of powdered ferro-magnetic material, a first winding supported on a hollow winding form in coaxial position within one of said cores and a second winding supported on a hollow winding form in coaxial position within the other of said cores, the base of each of said cores having a centrally positioned aperture providing a value of coupling between said windings larger than desired when said cores are positioned with their bases in closely spaced opposing relation, a conductive sheet material having a centrally positioned aperture of size selected to reduce to a desired value the coupling coefficient between said windings, said cores and said conductive material being positioned with their apertures in substantial alignment and with the bases of said cores in opposing relation but separated by said conductive material, a pair of externally threaded inductance-adjusting cores of powdered ferro-magnetic material threaded into said winding forms for individual movement with relation to individual ones of said windings to adjust the individual values of inductance thereof, and a terminal strip secured to the external surface of one of said cup-shaped cores to provide electrical terminals for said transformer.

11. An intermediate-frequency transformer comprising, a pair of formed flat-bottomed cup-shaped cores of powdered ferro-magnetic material, the base of each of said cores having a centrally positioned aperture, a first multi-layer winding supported on a hollow winding form in coaxial position within one of said cores and a second multi-layer winding supported on a hollow winding form in coaxial position within the other of said cores, the base of each of said cores having a centrally positioned aperture providing a value of coupling between said windings larger than desired when said cores are positioned with their bases in closely spaced opposing relation, a washer of conductive thin sheet material having a centrally positioned aperture, the parameters of said cores and washer being selected to reduce to a desired value the coupling coefficient between said windings, said cores and said washer being cemented together in coaxial relation with their apertures in substantial alignment and with the bases of said cores in opposing relation but separated by said washer, and a pair of externally threaded inductance-adjusting cores of powdered ferro-magnetic material threaded into said winding forms for individual movement with relation to individual ones of said windings to adjust the individual values of inductance thereof.

HOWARD D. EARL.
MARION J. PIFER.

REFERENCES CITED

The following references are of record in the file of this patent:

UNITED STATES PATENTS

| Number | Name | Date |
|---|---|---|
| 2,127,241 | Vogt | Aug. 16, 1938 |
| 2,307,447 | Braaten | Jan. 5, 1943 |
| 2,343,101 | Vogt | Feb. 29, 1944 |
| 2,364,291 | Harvey | Dec. 5, 1944 |
| 2,388,295 | Shea | Nov. 6, 1945 |
| 2,430,990 | Moore | Nov. 18, 1947 |

FOREIGN PATENTS

| Number | Country | Date |
|---|---|---|
| 457,263 | Great Britain | Nov. 24, 1936 |
| 502,296 | Great Britain | Mar. 15, 1939 |